Patented Sept. 4, 1951

2,567,117

UNITED STATES PATENT OFFICE 2,567,117

PROCESS FOR PRODUCING POLYCHLOROPRENE

Walter E. Mochel, Wilmington, Del., assignor to E. I. du Pont de Nemours & Company, Wilmington, Del., a corporation of Delaware No Drawing. Application July 24, 1948,
Serial No. 40,612

3 Claims. (Cl. 260—92.3)

This invention relates to an improvement in the process for producing polychloroprene and more particularly to a process for producing polychloroprene having improved properties.

Chloroprene, i. e., 2-chloro-1, 3-butadiene, has been polymerized under various conditions in the presence or absence of various modifying agents. The resulting polymers have possessed numerous properties which have made them commercially valuable as synthetic rubbers. These known polymers of chloroprene, which have been prepared by procedures ordinarily designed to produce the maximum yields of high molecular weight polymer, have possessed the highly desirable properties of good plasticity, solubility and workability; however, they have possessed the disadvantage of relatively poor storage stability. The incorporation of certain stabilizing agents in the chloroprene has improved their stability to some extent but these agents do not provide the high degree of stability desired in commercial applications where the polychloroprene, in the form of bulk polymer or cements, must be stored for periods of several months or more, particularly at elevated temperatures. Moreover, the large amount of information on polymerization of butadiene, e. g., the polymerization of butadiene-styrene synthetic rubber, is of no value in suggesting methods of producing stable polychloroprene because the former types of polymers do not exhibit the same type instability that polychloroprene does.

The object of this invention is to provide a process for producing polychloroprene having improved properties, and one wherein the polymerization of chloroprene can be carefully controlled to produce products of uniform characteristics.

I have found that polychloroprenes having improved properties, i. e., optimum balance of strength and stability, can be prepared by polymerizing chloroprene in alkaline emulsion in the presence of a polymerization regulator and arresting the polymerization at that predetermined density which corresponds to the maximum number average molecular weight as determined by osmotic pressure measurements on previous polymer samples prepared in a similar system. The products of this invention possess the maximum number average molecular weights obtainable in the particular polymerization systems being used. In addition, they possess markedly improved resistance to changes in viscosity, both intrinsic viscosity and working viscosity, on storage over the polychloroprenes of the prior art possessing greater weight average molecular weights, which is the particular average customarily implied by the term "molecular weight." (See "Advances in Colloid Science," vol. II, pp. 216–217, by Interscience Publishers, Inc., 1946, for a consideration of the types of molecular weight determination for high polymers.)

The procedure to be followed in practicing this invention involves the following essential features. The monomeric chloroprene is polymerized in alkaline aqueous emulsion in the presence of a polymerization catalyst, an emulsifying agent and a polymerization regulator until the specific gravity of the emulsion reaches a predetermined value which corresponds to that possessed by an emulsion of polychloroprene having the maximum number average molecular weight obtainable in such a system and which is determined as described below, whereupon a polymerization inhibitor is added immediately. The resulting emulsion of polychloroprene can be coagulated and the polymer isolated by conventional methods, or the emulsion, after removal of excess monomer, can be used as a latex. The excess monomer may be recovered and used in the preparation of further lots of polychloroprene.

In addition to corresponding to the maximum number average molecular weight of the polychloroprene contained therein, the particular specific gravity of the emulsion at the point where the polymerization is arrested also corresponds to a particular yield of polymer. This particular specific gravity will vary with the particular polymerization system employed, i. e., with the concentration of monomer, etc. The particular yield of polychloroprene corresponding to the polymer of maximum number average molecular weight also varies with the particular polymerization regulator and its particular concentration employed. For example, when aliphatic thiols having 8 to 18 carbon atoms are employed as the regulators in concentrations of from 0.02 to 0.5 mol per cent (based on monomeric chloroprene), the yields of polychloroprenes having the maximum number average molecular weight range from about 50% to about 75%. More specifically, when 1-dodecanethiol is used as regulator in a concentration of about 0.15 mol per cent, the yield of polychloroprene having optimum properties ranges from about 67% to about 72%. When a dialkyl dithiobis(thionoformate), e. g., the diisopropyl ester, is used as the polymerization regulator in concentrations of about 0.08 mol per cent, the yield of polychloroprene of maximum number average molecular weight ranges from about 70% to about 75%. The particular yields, of course, vary with the concentrations of regulator employed in a manner similar to that discussed above in connection with the aliphatic thiol regulators. Although the particular specific gravity and specific yield of polymer vary with different polymerization systems, the particular values at which the polymerization is to be arrested in order to obtain polychloroprenes having optimum properties can be accurately determined by the process of this invention.

The precise specific gravity at which the polymerization is to be arrested is determined by carrying out a preliminary polymerization of the chloroprene under conditions identical with those to be used in the system for which the value is being determined. Aliquot portions of the preliminary reaction mixture are removed periodically as the polymerization proceeds. The specific gravity of each sample is determined, the polymer coagulated from each sample, and the number average molecular weight of each sample of polymer is determined by the osmotic pressure method described by R. H. Wagner in Industrial and Engineering Chemistry, Analytical Edition, 16, 520 (1944). As the polymerization proceeds, the number average molecular weight of the polymer isolated from successive aliquots gradually increases until a maximum is reached and then gradually decreases. The specific gravity of the sample of polychloroprene having the maximum number average molecular weight is the end point to which the full scale or subsequent polymerization is to be carried.

While ordinarily after preliminary determinations the specific gravity of the polychloroprene emulsion will be used to determine the degree of polymerization, it will usually be found that the number average molecular weight of the polychloroprene will be within the range of from 125,000 to 400,000.

In carrying out the process of this invention, the polymerization of the chloroprene should be conducted in aqueous emulsion having a pH ranging between 9 and 12, and preferably between 10 and 12, for best results. The concentration of the chloroprene should be between 30% and 65% of the weight of the total emulsion. Best results are obtained when the concentration of monomer is between 35% and 50%. The polymerization proceeds at temperatures ranging from 5° to 60° C.; however, it is preferable to operate at temperatures between 10° and 40° C. The polymerization should be carried out in the absence of air or oxygen. This can be conveniently accomplished by blanketing the reaction mixture with an inert gas such as nitrogen or with the vapors of chloroprene. A commercial grade of chloroprene is satisfactory for use in this invention.

The process of this invention is illustrated by the following example, in which proportions of ingredients are expressed in parts by weight unless otherwise noted.

EXAMPLE

A solution consisting of 16.0 parts of Nancy wood rosin and 1.36 parts of 1-dodecanethiol dissolved in 400 parts of chloroprene is emulsified in 632 parts of an aqueous solution containing 2.4 parts of potassium persulfate, 3.8 parts of sodium hydroxide (U. S. P.) and 2.4 parts of formaldehyde/sodium naphthalenesulfonate condensation product. This emulsion is heated at 40° C. under nitrogen in a glass-lined vessel equipped with an efficient agitator. At approximately 10 minute intervals the specific gravity of this emulsion is determined by means of a hydrometer and, after each increase of about 0.01 in specific gravity, a sample amounting to 50 parts of latex is removed from the reaction mixture. To each sample is added immediately 1.5 parts of an emulsion prepared by dispersing a solution of 0.6 part of phenothiazine and 10 parts of phenyl-beta-naphthylamine dissolved in 80 parts of benzene in 120 parts of water containing 1.2 parts of sodium dodecylsulfate and 0.6 part of formaldehyde-sodium naphthalenesulfonate condensation product. The resulting stabilized sample is then coagulated by adding a large volume of ethanol (about 200 to 300 parts) and is dried to constant weight under reduced pressure at room temperature. The number average molecular weight of each sample of polychloroprene is then determined osmotically by the procedure of R. H. Wagner referred to previously. The values for time of polymerization, specific gravity, amount of polymer isolated, yield of polymer (or conversion) and number average molecular weight of the polymer for each of these samples, are summarized hereinafter in Table I.

*Table I*

| Sample No. | Time (Min.) [1] | Polychloroprene ||||| 
|---|---|---|---|---|---|---|
| | | Specific Gravity | Amount—Parts by Weight | Yield or Conversion, Per Cent [2] | No. Average Mol. Weight (±5%) | Intrinsic Viscosity $[\eta]$ |
| 1 | 29 | 0.988 | 1.96 | 10 | 114,000 | 0.91 |
| 2 | 46 | 0.999 | 3.79 | 20 | 121,000 | 0.99 |
| 3 | 59 | 1.010 | 5.94 | 30 | 177,000 | 1.07 |
| 4 | 69 | 1.021 | 7.14 | 40 | 200,000 | 1.09 |
| 5 | 81 | 1.031 | 9.19 | 50 | 203,000 | 1.10 |
| 6 | 111 | 1.046 | 10.17 | 64 | 194,000 | 1.16 |
| 7 | 124 | 1.051 | 13.14 | 69 | 230,000 | 1.20 |
| 8 | 143 | 1.056 | 14.28 | 75 | 199,000 | 1.25 |
| 9 | 325 | 1.066 | 14.66 | 85 | 155,000 | 1.61 |

[1] Time elapsed since emulsification.
[2] Yield calculated as follows:
50×sp. gr.=weight of latex sample.
Weight of latex sample×0.38=total weight of monomer and polymer in latex sample (the original emulsion contains 38% chloroprene by weight).
Dry weight of polymer from sample×100=per cent yield, or per cent conversion of monomer to polymer.
Total weight of polymer and monomer in sample.

From these data it is evident that the maximum number average molecular weight is reached at 69%–70% conversion, corresponding to a specific gravity of 1.051. This, then, is the predetermined specific gravity at which the polymerization of chloroprene in this specific system must be arrested to produce polychloroprene having the optimum balance of properties. This optimum yield for maximum number average molecular weight is not evident from conventional viscosity measurements (which indicate weight average molecular weights). Such viscosity data indicate maximum molecular weight at higher yields, and such polymers have poor stability. A chloroprene emulsion is then prepared in the manner described above, with the exception that the quantities of ingredients are increased ten-fold. The polymerization is allowed to proceed at 40° C. until the specific gravity of the emulsion reaches 1.051, whereupon 300 parts of the phenothiazine/phenyl-beta-naphthylamine emulsion is added. The latex is then steamed to remove excess monomer, coagulated by the procedure of U. S. Patent 2,187,146, and the resulting polymer is washed and dried. A yield of 69% of polychloroprene having excellent stability and mechanical properties is obtained.

The superiority of the raw stock stability of the polychloroprene of the above example, compared with that of a polymer prepared in a similar manner but which has been polymerized to a higher yield, is illustrated by the Williams Plasticity-Regain values summarized in Table II. These measurements are made with a Williams Plastometer (described in detail in Industrial and Engineering Chemistry, 16, 362 (1924)), and express plasticity as the height of the standard 2 cc. pellet of polymer in thousandths of an inch and regain in thousandths of an inch height increase when the weight on the plastometer is released.

Table II

| Chloroprene Polymerized to a Yield of — | Polychloroprene, Williams Plasticity—Regain | |
|---|---|---|
| | Original | After 4 days at 70° C. |
| 69% | 102–5 | 104–5 |
| 87% | 133–40 | 141–92 |

The very small increase in plasticity and regain values for the polymer prepared in 69% yield by the process of this invention after aging four days at 70° C. indicates high stability of the polymer in bulk storage. On the other hand, the considerable increase in plasticity and particularly in the regain value after aging of the polychloroprene prepared in 87% yield is so large that this type of polymer is considered unstable.

The superiority in stability of polychloroprene polymerized to the degree of conversion of this invention over the stability of polychloroprene polymerized to high conversions is further illustrated by the data in Table III. This table summarizes the intrinsic viscosities, measured in freshly prepared benzene solutions and in similar solutions aged three months at 25° C., of a polychloroprene of 69% conversion prepared by the process described in the example, and compares them with similar solutions of polychloroprenes polymerized to both lower and higher degrees of conversion.

Table III

| Chloroprene Polymerized to a Conversion of— | Polychloroprene | | |
|---|---|---|---|
| | Intrinsic Viscosity, [η] (measured in benzene solution) | | Per cent loss in [η] |
| | Original | Aged 3 months | |
| 30% | 0.99 | 0.81 | 18 |
| 50% | 1.05 | 0.82 | 22 |
| 69% | 1.16 | 0.83 | 28 |
| 80% | 1.40 | 0.86 | 39 |

These data show that there is a continual increase in loss of viscosity of polychloroprene with increase in per cent conversion of monomer to polymer. This loss in viscosity increases only 10% (from 18% to 28%) for polychloroprenes prepared in conversions varying almost 40% (from 30% to 69%). However, approximately the same increase in loss in viscosity (11%) occurs when the degree of conversion is increased only 11% (from 69% to 80%). It is thus evident that the rate of loss of viscosity increases about four-fold when chloroprene is polymerized to a degree of conversion beyond that corresponding to a polymer of maximum number average molecular weight. Such improved stability makes the products of this invention of greater value in commercial applications such as in cements.

The dry polychloroprene produced by the process of the above example is compounded on a rubber mill according to the following formula, in which parts are expressed by weight.

| | Parts |
|---|---|
| Polychloroprene | 100 |
| Light calcined magnesia | 10 |
| Zinc oxide | 5 |
| Sulfur | 1 |
| Di-ortho-tolylguanidine | 1 |

Slabs from this stock are vulcanized and tested by the method described in the American Society of Testing Materials method D–412–41. The results of the mechanical tests of vulcanizates obtained in this manner are summarized in Table IV, together with corresponding data for polychloroprene vulcanizates of the same composition but made from polychloroprenes polymerized to a lower and to a higher yield (corresponding to lower number average molecular weights).

Table IV

| Chloroprene Polymerized to a Conversion of: | Cure, °F. | Polychloroprene | | |
|---|---|---|---|---|
| | | Modulus at 600% elong., lbs./sq. in. | Tensile Strength at Break lbs./sq. in. | Elongation at Break Per Cent |
| 52% | 10 min./307 | 700 | 3,700 | 1,020 |
| 69% | 10 min./307 | 775 | 3,850 | 1,035 |
| 87% | 10 min./292 | 800 | 3,075 | 1,080 |

The polymerization of chloroprene by the process of this invention can be carried out in the presence of any water-soluble catalyst which is capable of generating free radicals. Catalyst of this type include the persulfates, the perborates, and certain peroxides and the like. Specific examples of these type of catalysts which are suitable include ammonium persulfate, sodium perborate and tertiarybutyl hydroperoxide. These catalysts can be used in proportions ranging from 0.1% to 1% of the weight of the monomeric chloroprene. However, they are generally used in proportions of about 0.5%.

A wide variety of emulsifying agents, including those generally employed in emulsion polymerization of chloroprene, are suitable for preparing chloroprene emulsions to be used in the practice of this invention. The preferred emulsifying agents are alkali metal salts of carboxylic acids such as sodium oleate and sodium rosinate. Other types which are also operable include the alkali metal salts of alkyl or aryl sulfonates, and their formaldehyde condensation products, e. g., the sodium salt of the sulfonic acid obtained by chlorosulfonation of the petroleum fraction known as white oil and sodium naphthalenesulfonate/formaldehyde condensation product, the alkali metal salts of long chain alkyl sulfates, e. g., sodium dodecyl sulfate, and quaternary ammonium salts, e. g., cetyltrimethyl ammonium bromide. These emulsifying agents can be used in proportions ranging from 1% to 10% of the weight of the monomeric chloroprene. They are generally used, however, in amounts of about 3% to 4% of the monomer.

Various types of polymerization regulators can be used in the process of this invention. The aliphatic thiols having from 8 to 18 carbon atoms and the dialkyl dithiobis(thionoformates) are the preferred regulators since they produce polychloroprenes having the greatest stability and the best plasticity and millability. Specific examples of these preferred types of polymerization regulators include 1-dodecanethiol, 1-tetradecanethiol,, 1-hexadecanethiol, and 1-octadecanethiol, diisopropyl dithiobis(thionoformate), and di-n-butyl dithiobis(thionoformate). Thiols having branched carbon chains of from 8 to 18 atoms are also suitable. Examples of this type are the commercial tertiary thiols made from mixed petroleum hydrocarbons having 12 carbon atoms. Examples of other types of polymerization regulators which are operable include iodoform, sulfur and sulfur dioxide. The concentration of regulator used depends, in general, on the particular mechanical properties desired in the polymer and on the particular regulator being employed. Amounts ranging from 0.1% to 2% of the weight of the chloroprene are satisfactory. The aliphatic thiols and the dithiobis(thionoformates) are generally employed in proportions of from 0.2% to 1% of the weight of the chloroprene and preferably in proportions of 0.4% to 0.5%. In general, the higher thiols are used in the higher amounts within these ranges of concentrations, and the lower thiols are used in the lower proportions. As indicated previously, the particular conversion corresponding to the maximum number average molecular weight will depend upon the regulator used and the amount employed, and may range from 10% to over 90% in extreme cases.

Conventional polymerization inhibitors are satisfactory for use in stopping the polymerization of the chloroprene at the point of maximum number average molecular weight. Specific examples of these inhibitors include hydroquinone, p-tertiarybutyl catechol, and phenothiazine.

Because of their excellent mechanical properties, the polychloroprenes produced by the process of this invention are particularly suitable for compounding with conventional rubber compounding ingredients and forming into the desired shapes, e. g., films, sheets, tubes, etc., which are converted by heat into tough, elastic products. Because of their stability, the polychloroprenes of this invention are particularly useful for use in cements and in other applications requiring the storage of the polymer for considerable lengths of time before final use.

I claim:
1. In the process of polymerizing chloroprene in an alkaline emulsion system having a pH ranging from 9 to 12 and a chloroprene concentration in the emulsion of from 30% to 65% of the weight of the total emulsion, the steps which comprise carrying out the polymerization in the presence of a polymerization regulator of the group consisting of alkyl thiols containing from 8 to 18 carbon atoms, dialkyl dithiobis(thionoformates), iodoform, sulfur and sulfur dioxide and a chloroprene polymerization catalyst to the point where the polymer has the maximum number average molecular weight obtainable in the system employed and which is within the range of from 125,000 to 400,000, and arresting the polymerization when this point is reached.

2. A process of polymerizing chloroprene which comprises carrying out the polymerization in an aqueous emulsion system having a pH range of from 9 to 12 and in which the concentration of the chloroprene is from 30% to 65% of the weight of the total emulsion, there being present in the polymerization mass a polymerization regulator comprising an alkyl thiol having from 8 to 18 carbon atoms and a chloroprene polymerization catalyst, carrying the polymerization to the point where the polymer has the maximum number average molecular weight obtainable in the system employed and which is within the range of from 125,000 to 400,000, and arresting the polymerization when this point is reached by the addition of a chloroprene polymerization inhibitor.

3. A process of polymerizing chloroprene which comprises carrying out the polymerization in an aqueous emulsion system having a pH range of from 9 to 12 and in which the concentration of the chloroprene is from 35% to 50% of the weight of the total emulsion at a temperature of about 40° C. and in the presence of about 0.34% of 1-dodecane thiol as the sole polymerization regulator and a chloroprene polymerization catalyst, carrying the polymerization to a point where from 67% to 72% of the chloroprene has been polymerized, and arresting the polymerization at such point by the addition of chloroprene polymerization inhibitor.

WALTER E. MOCHEL.

REFERENCES CITED

The following references are of record in the file of this patent:

UNITED STATES PATENTS

| Number | Name | Date |
|---|---|---|
| 1,950,442 | Williams | Mar. 13, 1934 |
| 2,234,211 | Walker | Mar. 11, 1941 |
| 2,264,173 | Collins | Nov. 25, 1941 |
| 2,316,598 | Kitani | Apr. 13, 1943 |
| 2,362,052 | Craig | Nov. 7, 1944 |
| 2,494,087 | Daniels | Jan. 10, 1950 |